US011095341B2

(12) United States Patent
Tang et al.

(10) Patent No.: US 11,095,341 B2
(45) Date of Patent: Aug. 17, 2021

(54) METHOD AND DEVICE FOR TRANSMITTING SIGNAL

(71) Applicant: GUANGDONG OPPO MOBILE TELECOMMUNICATIONS CORP., LTD., Guangdong (CN)

(72) Inventors: Hai Tang, Dongguan (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/331,476

(22) PCT Filed: Sep. 19, 2016

(86) PCT No.: PCT/CN2016/099397
§ 371 (c)(1),
(2) Date: Mar. 7, 2019

(87) PCT Pub. No.: WO2018/049693
PCT Pub. Date: Mar. 22, 2018

(65) Prior Publication Data
US 2019/0199407 A1   Jun. 27, 2019

(51) Int. Cl.
*H04B 7/0408*  (2017.01)
*H01Q 3/40*  (2006.01)
(Continued)

(52) U.S. Cl.
CPC .............. *H04B 7/0408* (2013.01); *H01Q 3/40* (2013.01); *H04B 7/0417* (2013.01);
(Continued)

(58) Field of Classification Search
CPC .. H04B 7/0408; H04B 7/0417; H04B 7/0626; H04B 7/0619; H04L 5/0023
See application file for complete search history.

(56) References Cited

U.S. PATENT DOCUMENTS 7,697,622 B2   4/2010  Han
8,379,751 B2   2/2013  Lin
(Continued)

FOREIGN PATENT DOCUMENTS

CN   1320317 A   10/2001
CN   1732636 A   2/2006
(Continued)

OTHER PUBLICATIONS

Convida Wireless:"Discussion on Beamforming Initial Access Operations", 3GPP Draft; RI-167840 Discussion on Beamforming, 3rd Generation Partnership Project (3GPP), Mobile Competence Centre ; 650, Route Des Lucioles ; F-06921 Sophia-Antipolis Cedex ;France,vol. RAN WG1, No. Gothenburg, Sweden; Aug. 22, 2016-Aug. 26, 2016 Aug. 21, 2016 (Aug. 21, 2016), XP051140827, Retrieved from the Internet: URL:http://www.3gpp.org/ftp/Meetings_3GPP_SYNC/RAN1/Docs/.

(Continued)

*Primary Examiner* — Brenda H Pham
(74) *Attorney, Agent, or Firm* — Ladas & Parry LLP (57) ABSTRACT

Disclosed in an embodiment of the invention are a method and device for transmitting a signal. The method comprises: a first device determining, according to a base parameter set and/or an operating frequency band used to transmit signals, the number of wave beams used to transmit the signals, or determining a number of the transmitted signals N, where N is a positive integer; and the first device transmitting, according to the number of wave beams or the number of the transmitted signals N, the signals with a second device. The method and device of the embodiment of the invention can flexibly determine, according to a transmission characteristic between a terminal device and a network, the number of wave beams used to transmit signals, or determine the (Continued)

number of the transmitted signals, thereby obtaining better beamforming gain.

15 Claims, 2 Drawing Sheets

(51) Int. Cl.
    *H04B 7/0417*     (2017.01)
    *H04B 7/06*     (2006.01)
    *H04L 5/00*     (2006.01)

(52) U.S. Cl.
    CPC ......... *H04B 7/0617* (2013.01); *H04L 5/0023* (2013.01); *H04B 7/0619* (2013.01); *H04B 7/0626* (2013.01)

(56) References Cited

U.S. PATENT DOCUMENTS

| | | | |
|---|---|---|---|
| 2004/0121810 A1 | 6/2004 | Goransson | |
| 2006/0079290 A1* | 4/2006 | Seto | H01Q 3/2605 455/562.1 |
| 2007/0104283 A1 | 5/2007 | Han | |
| 2007/0116138 A1* | 5/2007 | Tsai | H04L 27/2601 375/260 |
| 2008/0278374 A1 | 11/2008 | Xu | |
| 2009/0298509 A1* | 12/2009 | Hoshino | H04B 7/0408 455/452.2 |
| 2010/0120418 A1 | 5/2010 | Anil | |
| 2011/0044376 A1 | 2/2011 | Lin | |
| 2011/0074916 A1 | 3/2011 | Demirdjian | |
| 2013/0156120 A1* | 6/2013 | Josiam | H04L 5/0023 375/260 |
| 2014/0098912 A1 | 4/2014 | Gupta et al. | |
| 2016/0019113 A1 | 1/2016 | Hasebe et al. | |
| 2016/0080060 A1 | 3/2016 | Yu et al. | |
| 2017/0026938 A1* | 1/2017 | Onggosanusi | H04L 5/0051 |

FOREIGN PATENT DOCUMENTS

| | | |
|---|---|---|
| CN | 1863004 A | 11/2006 |
| CN | 101300749 A | 11/2008 |
| CN | 101614939 A | 8/2010 |
| CN | 101861704 A | 10/2010 |
| CN | 104969486 A | 10/2015 |
| CN | 105103261 A | 11/2015 |
| CN | 107733545 A | 2/2018 |
| EP | 1576597 A1 | 9/2005 |
| JP | 2006512001 A | 4/2006 |
| RU | 2321950 C2 | 4/2008 |
| WO | 2015119359 A1 | 8/2015 |

OTHER PUBLICATIONS

Nokia et al:"Frame Structure Support for Beam Based Common Control Plane", 3GPP Draft; RI-167265, 3rd Generation Partnership Project (3GPP ) ,Mobile Competence Centre ; 650, Route Des Lucioles ; F-06921 Sophia-Antipolis Cedex; France,vol. RAN WG1, No. Gothenburg, Sweden; Aug. 22, 2016-Aug. 26, 2016 Aug. 21, 2016 (Aug. 21, 2016), XP051125799, Retrieved from the Internet: URL:http://www.3gpp.org/ftp /Meetings_3GPP_SYNC/RAN1/Docs/.
Supplementary European Search Report in the European application No. 16916073.6, dated Jul. 9, 2019.
International Search Report in international application No. PCT/CN2016/099397, dated Jun. 1, 2017.
Written Opinion of the International Authority in international application No. PCT/CN2016/099397, dated Jun. 1, 2017.
Intel Corporation, Initial performance evaluation of different beamforming options for NR synchronization signals, 3GPP TSG RAN WG1 Meeting #86 R1-167707, Aug. 12, 2016 (Aug. 12, 2016), p. 1-6.
ZTE, Consideration of cyclic peefix for NR, 3GPP TSG RAN WG1 Meeting #86 R1-166406, Aug. 12, 2016 (Aug. 12, 2016), p. 1-3.
MediaTek Inc., Beam Management Considerations for above 6 GHz NR, 3GPP TSG RAAN WG1 Meeting #86 R1-167543, Aug. 22-26, 2016 (Aug. 22-26, 2016).
Samsung, etc., WF on numerology for synchronization signals in NR, 3GPP TSG RAN WG1 Meeting #86 R1-168277, Aug. 22-26, 2016 (Aug. 22-26, 2016).
Notice of Allowance of the Chinese application No. 201680089335.2, dated Aug. 3, 2020.
First Office Action of the Brazilian application No. 1120190052445, dated Aug. 25, 2020.
Second Office Action of the European application No. 16916073.6, dated Aug. 14, 2020.
First Office Action of the Chilean application No. 201900713, dated Dec. 24, 2019.
Second Office Action of the Chilean application No. 201900713, dated Jun. 1, 2020.
Notice of Allowance in corresponding Russian application No. 2019111252, dated Mar. 10, 2020.
First Office Action in corresponding European application No. 16916073.6, dated Mar. 25, 2020.
First Office Action in corresponding Chinese application No. 201680089335.2, dated Mar. 26, 2020.
First Office Action in corresponding Canadian application No. 3037334, dated Apr. 21, 2020.
Written Opinion in corresponding Singaporean application No. 11201902384R, dated May 21, 2020.
Second Office Action in corresponding Chilean application No. 201900713, dated Jun. 1, 2020.
Nokia Networks; "Basic system design for UL NB-IoT", 3GPP TSG-RAN WG1 NB-IoT Adhoc, R1-160041, Budapest, Hungary, Jan. 18-20, 2016, 3 pages.
First Office Action of the Japanese application No. 2019-515369, dated Oct. 2, 2020.
Office Action of the Indian application No. 201917015563, dated Oct. 22, 2020.
Written Opinion of the International Search Authority in international application No. PCT/CN2016/099397, dated Jun. 1, 2017.
ZTE et al., "WF on aperiodic CSI reporting", 3GPP TSG RAN WG1 Meeting #86, R1-168386, Gothenburg, Sweden, Aug. 22-26, 2016, 2 pages.
Third Office Action of the European application No. 16916073.6, dated Feb. 8, 2021.
First Office Action of the Taiwanese application No. 106128833, dated Feb. 26, 2021.
3GPP TSG RAN WG1 #84bis R1-162183, Busan, Korea, Apr. 11-15, 2016, Agenda item: 8 1.7; Source Samsung: Title: MIMO/beamforming for 5G new radio interface for over-6GHz: system architecture and design aspects, 9 pages.
First Office Action of the Chinese application No. 202011003851.3, dated May 21, 2021.
Decision of Refusal of the Japanese application No. 2019-515369, dated Jun. 25, 2021.

\* cited by examiner

A first device determines the beam number for transmitting the signals or determines the transmission number N of the signals according to at least one of a numerology or an operating frequency band for transmitting signals, wherein N is a positive integer — S110

The first device performs transmission of the signals with a second device according to the beam number or the transmission number N — S120

METHOD AND DEVICE FOR TRANSMITTING SIGNAL

RELATED APPLICATION

This application is an application under 35 U.S.C. 371 of International Application No. PCT/CN2016/099397 filed on Sep. 19, 2016, the entire contents of which are incorporated herein by reference.

TECHNICAL FIELD

The disclosure relates to the field of communications, and in particular to a method and a device for transmitting signals.

BACKGROUND

A Multiple-Input Multiple-Output (MIMO) technology is one of core technologies in a Long Term Evolution (LTE) system and may greatly improve a transmission rate of the system. Beamforming is a signal preprocessing technology based on an antenna array. In the beamforming, a beam with directivity is generated by adjusting a weight of each signal transmitted on each antenna array element.

In a conventional art, generally, the number of beams for transmitting signals between a base station and a terminal device is pre-configured and is relatively single. Along with continuous evolution of a wireless communication technology, there is an urgent need for a new method for transmitting the signals that can flexibly determine the number of beams for transmitting the signals according to transmission characteristics between the terminal device and the base station to obtain a better beamforming gain.

SUMMARY

The embodiments of the disclosure provide a method and device for transmitting signals, which may flexibly determine the beam number for transmitting the signals or the transmission number of the signals according to transmission characteristics between a terminal device and a network device to obtain a better beamforming gain.

According to a first aspect, the disclosure provides a method for transmitting signals, which may include the following operations. A first device determines, according to at least one of a numerology or an operating frequency band for transmitting the signals, a beam number for transmitting the signals or a transmission number N of the signals, N being a positive integer. The first device performs transmission of the signals with a second device according to the beam number or the transmission number N.

The beam number or the transmission number of the signals can be flexibly determined according to the numerology and/or the operating frequency band used to transmit the signals and thus a better beamforming gain may be obtained.

In an optional embodiment, the transmission number of the signals may be represented by the number of resources, for example, the number of Channel State Information-Reference Signal (CSI-RS) resources.

In combination with the first aspect, in a first possible implementation manner of the first aspect, before the operation that the first device determines, according to at least one of the numerology or the operating frequency band for transmitting the signals, the beam number for transmitting the signals or the transmission number N of the signals, the method may further include: the first device determines the numerology from at least one numerology, or determines the operating frequency band from at least one operating frequency band.

Since different numerologies or operating frequency bands generally correspond to different beamwidths, when a plurality of numerologies or a plurality of operating frequency bands are provided between the first device and the second device, different numbers of beams may be used to perform beamforming at different beamwidths. Therefore, a good tradeoff between the signal overhead and the beamforming gain may be achieved.

In combination with the first aspect or any implementation manner of the first aspect, in a second possible implementation manner of the first aspect, the operation that a first device determines, according to at least one of the numerology or the operating frequency band for transmitting the signals, the beam number for transmitting the signals or the transmission number N of the signals includes the following actions. The first device determines, according to the numerology and a predefined first association, the beam number or the transmission number N. The first association is an association between the numerology and the beam number or an association between the numerology and the transmission number N. In an alternative embodiment, the first device determines, according to the operating frequency band and a predefined second association, the beam number or the transmission number N. The second association is an association between the operating frequency band and the beam number or an association between the operating frequency band and the transmission number N.

In an optional embodiment, the first association or the second association may be agreed in advance between a network device and a terminal device, and may also be configured and indicated by the network device to the terminal device via signaling.

In combination with the first aspect or any implementation manner of the first aspect, in a third possible implementation manner of the first aspect, the operation that the first device performs transmission of the signals with the second device according to the beam number or the transmission number N includes the following actions. The first device determines, according to the beam number or the transmission number N, physical resources or sequence resources corresponding to the beam number or the transmission number N. The first device transmits the signals with the second device by adopting the physical resources or the sequence resources.

In an optional embodiment, an association between the beam number or the transmission number N and the physical resources or the sequence resources may be agreed in advance between the terminal device and the network device.

In combination with the first aspect or any implementation manner of the first aspect, in a fourth possible implementation manner of the first aspect, the operation that the first device performs transmission of the signals with the second device according to the beam number includes the following action. According to the beam number, the first device sends the signals beamformed with beams corresponding to the beam number to the second device, or the first device receives the signals beamformed with the beams corresponding to the beam number from the second device.

In combination with the first aspect or any implementation manner of the first aspect, in a fifth possible implementation manner of the first aspect, the operation that the first device performs transmission of the signals with the second device according to the transmission number N includes the following action. The first device sends N signals to the second device according to the transmission number N, or the first device receives N signals sent by the second device according to the transmission number N.

In an optional embodiment, N signals are beamformed with different beams. N is a positive integer greater than 1.

In combination with the first aspect or any implementation manner of the first aspect, in a sixth possible implementation manner of the first aspect, after the first device performs transmission of the signals with the second device according to the beam number or the transmission number N, the method further includes the following operations. The first device receives, according to the beam number or the transmission number N, feedback information from the second device, or the first device sends, according to the beam number or the transmission number N, feedback information to the second device. The feedback information is to indicate a first beam in a beam set corresponding to the beam number, or a first signal in a signal set corresponding to the transmission number N.

In combination with the first aspect or any implementation manner of the first aspect, in a seventh possible implementation manner of the first aspect, the feedback information includes at least one of a beam identifier of the first beam or CSI corresponding to the beam identifier, or the feedback information includes at least one of a signal identifier of the first signal or CSI corresponding to the signal identifier.

In an optional embodiment, the CSI may be at least one of a Rank Indication (RI), a Precoding Matrix Indicator (PMI), a Channel Quality Indicator (CQI) or the the like.

In combination with the first aspect or any implementation manner of the first aspect, in an eighth possible implementation manner of the first aspect, the signals include at least one of the following signals: a synchronization signal, a broadcast signal, a random access signal or a downlink reference signal.

In combination with the first aspect or any implementation manner of the first aspect, in a ninth possible implementation manner of the first aspect, the numerology includes at least one of the following parameters: a subcarrier spacing, the number of subcarriers in a system bandwidth, the number of subcarriers in a Physical Resource Block (PRB), a length of an Orthogonal Frequency Division Multiplexing (OFDM) symbol, the point number of Fast Fourier Transformation (FFT) or Inverse Fast Fourier Transform (IFFT) for generating an OFDM signal, the number of OFDM symbols in a Transmission Time Interval (TTI), the number of TTIs in a predetermined period of time or a type of a signal prefix.

In combination with the first aspect or any implementation manner of the first aspect, in a tenth possible implementation manner of the first aspect, the operation that the first device determines the numerology from at least one numerology includes the following action. The first device determines the numerology according to indication information sent by the second device, where the indication information is to indicate one of the at least one numerology; or, the first device determines the numerology from the at least one numerology according to a service type or an operating frequency point of transmission data; or, the first device determines the numerology via a blind detection on the at least one numerology.

In an optional embodiment, the numerology may also be pre-configured by the network device, and the numerology may also be obtained through the blind detection.

In an optional embodiment, the first device is a network device and the second device is a terminal device; or, the first device is a terminal device and the second device is a network device; or the first device is a terminal device and the second device is a terminal device.

According to a second aspect, the disclosure provides a terminal device. The terminal device is configured to execute the method in the first aspect or any possible implementation manner of the first aspect. Specifically, the terminal includes units configured to execute the method in the first aspect or any possible implementation manner of the first aspect.

According to a third aspect, the disclosure provides a network device. The network device is configured to execute the method in the first aspect or any possible implementation manner of the first aspect. Specifically, the terminal includes units configured to execute the method in the first aspect or any possible implementation manner of the first aspect.

According to a fourth aspect, the disclosure provides a device, which includes a memory, a processor, a transceiver and a bus system. The memory, the processor and the transceiver are connected via the bus system. The memory is configured to store an instruction. The processor is configured to execute the instruction stored in the memory, and when the instruction is executed, the processor executes the method in the first aspect and controls the transceiver to receive input data and information and output data such as an operation result.

A fifth aspect, the disclosure provides a computer storage medium. The computer storage medium is configured to store a computer software instruction used by the method. The computer software instruction includes a program designed to execute the above aspects.

In the disclosure, the names of the terminal device and the network device are not intended to limit the devices. In actual implementation, these devices may be named by other words. As long as a function of each device is similar to the disclosure, the devices fall into the scope of claims of the disclosure and equivalent technologies thereof.

These aspects or other aspects of the disclosure will become more apparent in the description of the following embodiments.

BRIEF DESCRIPTION OF DRAWINGS

In order to describe the technical solutions in the embodiments of the disclosure more clearly, the drawings required to be used in the embodiments will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

It should be understood that the technical solutions of the disclosure may be applied in various communications systems, such as a Global System of Mobile communication (GSM) system, a Code Division Multiple Access (CDMA) system, a Wideband Code Division Multiple Access (WCDMA) system, a General Packet Radio Service (GPRS) system, an LTE system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system or a future 5th Generation (5G) system.

Particularly, the technical solutions in the embodiments of the disclosure may be applied to various communication systems based on a non-orthogonal multiple access technology, such as a Sparse Code Multiple Access (SCMA) system and a Low Density Signature (LDS) system. Of course, the SCMA system and the LDS system may also be referred to as other names in the field of communications. Further, the technical solutions in the embodiments of the disclosure may be applied to multi-carrier transmission systems adopting the non-orthogonal multiple access technology, such as an Orthogonal Frequency Division Multiplexing (OFDM) system, a Filter Bank Multi-Carrier (FBMC) system, a Generalized Frequency Division Multiplexing (GFDM) system, a Filtered-OFDM (F-OFDM) system and the like.

The terminal device in the embodiments of the disclosure may be User Equipment (UE), an access terminal, a user unit, a user station, a mobile radio station, a mobile station, a remote station, a remote terminal, a mobile device, a user terminal, a terminal, a wireless communication device and a user proxy or a user device. The access terminal may be a cellular phone, a cordless telephone, a Session Initiation Protocol (SIP) phone, a Wireless Local Loop (WLL) station, a Personal Digital Assistant (PDA), a handheld device with a wireless communication function, a computing device or other processing devices connected to a wireless modem, a vehicle-amounted device and a wearable device, a terminal device in a future 5G network or a terminal device in a future evolved Public Land Mobile Network (PLMN), which are not limited in the embodiments of the disclosure.

The network device in the embodiments of the disclosure may be a device used for communicating with the terminal device. The network device may be a Base Transceiver Station (BTS) in a GSM or CDMA, may also be a NodeB (NB) in a WCDMA system, may further be an Evolutional NodeB (eNB or eNodeB) in an LTE system and may further be a wireless controller in a Cloud Radio Access Network (CRAN) scene, or the network device may be a relay station, an access point, a vehicle-amounted device, a wearable device, a network device in the future 5G system or a network device in the future evolved PLMN network, which are not limited in the embodiments of the disclosure.

In the embodiments of the disclosure, the first device may be a network side device, and may also be a terminal device; the second device may be a network side device, and may also be a terminal device, which are not limited in the disclosure.

Figure 1:
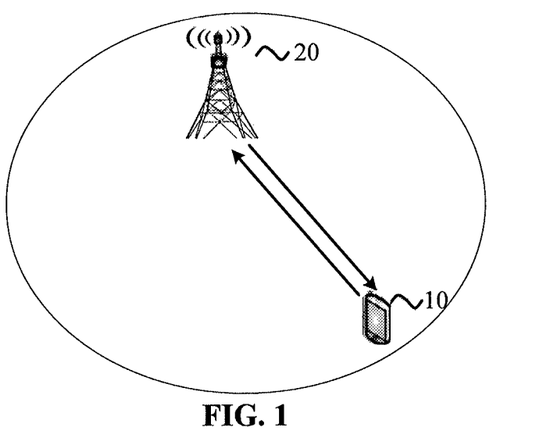
FIG. 1 illustrates a schematic diagram of a possible application scenario provided by an embodiment of the disclosure.

FIG. 1 is a schematic diagram of an application scenario according to the disclosure. The communication system in FIG. 1 may include a terminal device 10 and a network device 20. The network device 20 is configured to provide a communication service for the terminal device 10 and is accessed to a core network. The terminal device 10 is accessed to the network by searching a synchronization signal, a broadcast signal and the like sent by the network device 20 and thus performs communication with the network. The arrow illustrated in FIG. 1 may represent uplink/downlink transmission performed via a cellular link between the terminal device 10 and the network device 20.

Figure 2:
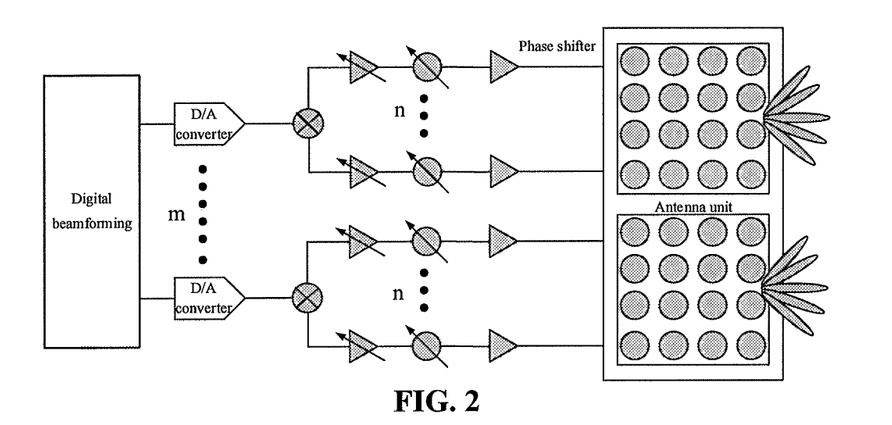
FIG. 2 illustrates a schematic diagram of a possible beamforming.

In a 5G system, it is necessary to support data transmission at a high frequency band (the central frequency is 6 GHz or more and typically may be, for example, 28 GHz) to meet the requirement of the 5G on the transmission rate. During the data transmission at the high frequency band, in order to achieve a higher transmission rate, a Multiple Input Multiple Output (MIMO) technology needs to be adopted. With the adoption of the MIMO technology at the high frequency band, the demand on a radio-frequency device of an antenna is very high and thus the hardware cost of the antenna (such as Analogue-to-Digital (A/D) and Digital to Analogue (D/A) converters) is also greatly increased. In order to reduce the cost, a hybrid beamforming technology is usually adopted at the high frequency band to reduce the number of receiving-transmitting radio-frequency units. As illustrated in FIG. 2, digital beamforming is performed on a data signal to form a digital transmission signal of each radio-frequency unit and then the digital transmission signal is converted into an analogue signal by the D/A converter. The analogue signal corresponding to each radio-frequency unit is formed into an analogue beamforming signal via different phase shifter to transmit on different antenna units, thereby implementing the beamforming in an analogue domain. With the hybrid beamforming method, the number of radio-frequency channels may be reduced. Therefore, the hardware cost is reduced and further a beamforming gain is obtained. Beside the sending end, the number of receiving channels may also be reduced with a similar method by analogue receiving beamforming at a receiving end.

Generally, the wider the beams, the less the required beams, or otherwise, the more the required beams. The beamwidth is associated with factors such as the adopted subcarrier spacing and operating frequency band. For example, a higher operating frequency band may correspond to a narrower beamwidth and thus the more beams are required.

Figure 3:
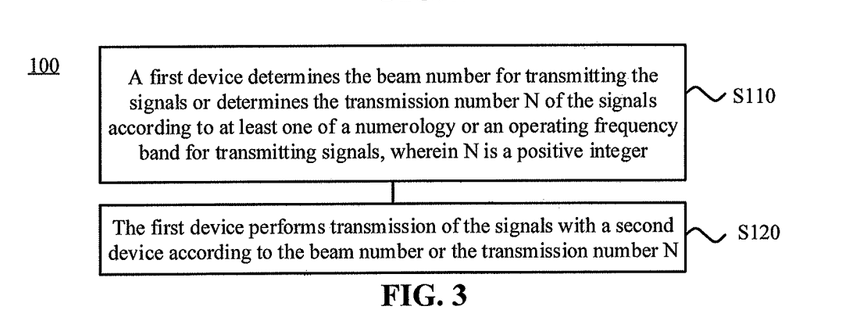
FIG. 3 illustrates a schematic block diagram of a method for transmitting signals provided by an embodiment of the disclosure.

FIG. 3 illustrates a schematic block diagram of a method 100 for transmitting signals according to an embodiment of the disclosure. As illustrated in FIG. 3, the method 100 may include the following operations.

At S110, according to at least one of a numerology or an operating frequency band for transmitting signals, a first device determines the beam number for transmitting the signals or determines the transmission number N of the signals, wherein N is a positive integer.

At S120, the first device performs transmission of the signals with a second device according to the beam number or the transmission number N.

First of all, it is necessary to explain the following several points.

1. The first device and the second device used herein may be a terminal device and a network device respectively, and may also be a terminal device and a terminal device. For the convenience of description, the following will be described with signals transmitted between the terminal device and the network device as an example.

2. The signals used herein may be an uplink signal, and may also be a downlink signal. It may be a synchronization signal, may be a broadcast signal such as a Physical Broadcast Channel (PBCH) and a System Information Block (SIB), may also be a random access signal and may further be a downlink reference signal such as a CSI-RS and a Demodulation Reference Signal (DMRS).

3. As used herein, the beam number (i.e., the number of beams) and the transmission number N are in one-to-one association. Specifically, N beamforming signals may be obtained via N beams.

4. As used herein, the transmission of the signal with the second device refers to perform receiving and sending of the signals with the second device. It may be that the first device receives the signals sent by the second device, and may also be that the first device sends the signals to the second device.

Along with the continuous evolution of a communication technology, diversified service types are required in a future communication system and thus the communication requirement cannot be met by the single subcarrier width in the LTE system. Different from the LTE system, in order to keep the flexibility and the forward compatibility of a system, multiple numerologies or operating frequency bands may be provided in a carrier/cell/a Transmit Receive Point (TRP) of the future wireless communication system such as 5G. For example, generally, different carrier spacings are adopted for different numerologies. Hence, different numerologies or different operating frequency bands correspond to different beamwidths. In the future wireless communication system such as 5G, there is a need for a new method for transmitting the signals, through which different numbers of beams are used to perform beamforming at different beamwidths and thus a good tradeoff between the signal overhead and the beamforming gain may be achieved.

In an optional embodiment of the disclosure, before the first device determines, according to at least one of the numerology or the operating frequency band for transmitting the signals, the beam number for transmitting the signals or the transmission number N of the signals, the method may further include the following operations. The first device determines the numerology from at least one numerology, or determines the operating frequency band from at least one operating frequency band.

Specifically, the operation that the first device determines the numerology from at least one numerology includes the following actions. The first device determines the numerology according to indication information sent by the second device, wherein the indication information is used for indicating one of the at least one numerology; or, the first device determines the numerology from the at least one numerology according to a service type or an operating frequency point of transmission data; or, the first device determines the numerology via a blind detection on the at least one numerology.

It should be understood that, the numerology may be determined by the first device according to own transmission parameters (such as a service type or an operating frequency point of a current signal), may also be selected from at least one numerology configured in the first device, may further be agreed in advance by the first device and the second device, and may further be a numerology selected by the second device from at least one numerology configured in the second device and notified to the first device, etc. The numerology may also be obtained by the first device via the blind detection on the at least one numerology. The manner for obtaining the numerology by the first device is not defined in the disclosure. For example, the terminal device may perform the blind detection on each subcarrier spacing in a predefined subcarrier spacing set until a signal transmitted with a certain subcarrier spacing is detected. In another example, the terminal device and the network device may agree numerologies corresponding to different operating frequency points in advance, and the terminal device may determine a corresponding numerology according to an operating frequency point of the current transmission data.

It should be further understood that the operating frequency band (i.e., a frequency band or frequency point range or a certain frequency point used for current transmission signals) may be, for example, 0-6 GHz, 6-28 GHz, 28-40 GHz, 40-60 GHz and 60 GHz or more, etc.

In an optional embodiment, the above numerology may include at least one parameter and specifically includes at least one of the following parameters: a subcarrier spacing, the number of sub-carriers in a special bandwidth, the number of sub-carriers in a PRB, the length of an OFDM symbol, the point number of Fourier Transform such as FFT or inverse Fourier transform such as IFFT for generating an OFDM signal, the number of OFDM symbols in a TTI, the number of TTIs in a special time length or a type of a signal prefix. More specifically, the at least one parameter may be a parameter for determining time-frequency resources of the transmission signals.

The subcarrier spacing refers to a frequency interval of adjacent subcarriers, for example, 15 kHz and 60 khz. The number of subcarriers in the specific bandwidth is, for example, a subcarrier number corresponding to each possible system bandwidth. The number of subcarriers in the PRB may typically be, for example, an integral multiple of 12. The number of OFDM symbols in the TTI may typically be, for example, an integral multiple of 14. The number of TTIs in a certain length of time may refer to the number of TTIs in a time length of 1 ms or 10 ms. The length of a signal prefix is, for example, a time length of a CP of a signal or whether the CP adopts a normal CP or an extended CP.

In an optional embodiment of the disclosure, the operation that the first device determines, according to according to at least one of the numerology or the operating frequency band for transmitting the signals, the beam number for transmitting the signals or the transmission number N of the signals includes the following actions. The first device determines the beam number or the transmission number N according to the numerology and a predefined first association, wherein the first association is an association between the numerology and the beam number or an association between the numerology and the transmission number N; or the first device determines the beam number or the transmission number N according to the operating frequency band and a predefined second association, wherein the second association is an association between the operating frequency band and the beam number or an association between the operating frequency band and the transmission number N.

In an optional embodiment, the device may further determine the beam number or the transmission number N according to the numerology and the operating frequency band as well as a third association. The third association may be an association among the numerology, the operating frequency band and the beam number, and may also be an association among the numerology, the operating frequency band and the number of signals.

It should be understood that the above associations may be indicated to the terminal device by the network device, and may also be agreed in advance by the network device and the terminal device. The following will be described in detail with associations in Table 1 to Table 3 as an example.

TABLE 1

| Subcarrier spacing | The beam number or the transmission number |
|---|---|
| 15 kHz | 4 |
| 30 kHz | 8 |
| 60 kHz | 8 |
| 120 kHz | 16 |
| 240 kHz | 32 |

TABLE 2

| The number of OFDM symbols in a sub-frame | The beam number or the transmission number |
|---|---|
| 14 | 4 |
| 28 | 8 |
| 56 | 16 |
| 112 | 32 |
| 224 | 64 |

TABLE 3

| Operating frequency band (GHz) | The beam number or the transmission number |
|---|---|
| 0-2.0 | 8 |
| 2.0-6 | 16 |
| 6-28 | 32 |
| 28-70 | 64 |

For example, when the terminal device sends a random access signal to the network device and the terminal device can determine that a subcarrier spacing used to transmit the random access signal is 15 kHz according to own transmission characteristics or a blind detection on a plurality of subcarrier spacings, the above Table 1 may be agreed by the terminal device and the network device in advance and stored in the terminal device and/or the network device, and thus the terminal device and/or the network device may determine that the beam number for transmitting the random access signal or the corresponding transmission number for transmitting the random access signal is 4 according to Table 1. Also for example, when the network device sends a downlink reference signal such as CSI-RS to the terminal device, the network device may determine that the operating frequency band used to transmit the CSI-RS is 6-28 GHz according to own transmission characteristics or the blind detection on a plurality of subcarrier spacings. Similarly, the above Table 3 may be agreed by the terminal device and the network device in advance and stored in the terminal device and/or the network device, and thus the terminal device and/or the network device may determine that the beam number for transmitting the CSI-RS or the corresponding transmission number for transmitting the CSI-RS is 32 according to Table 3.

It should be understood that the transmission number N of the signals may be represented by resources used by the signals. For example, the signals may be represented by CSI-RS resources. In this case, the transmission number N is the number of the CSI-RS resources, or may be obtained from the number of the CSI-RS resources.

In an optional embodiment of the present disclosure, the operation that the first device performs the transmission of the signals with the second device according to the beam number or the transmission number N includes the following actions. The first device determines, according to the beam number or the transmission number N, physical resources or sequence resources corresponding to the beam number or the transmission number N, and the first device transmits the signals with the second device by adopting the physical resources or the sequence resources.

Specifically, physical resources used by signals corresponding to respective beams may be agreed in advance between the terminal device and the network device. The terminal device and/or the network device determines the signals corresponding to the beams to be sent according to the beam number or the transmission number N and performs reception and transmission of corresponding signals on physical resources used by the signals corresponding to each beam. For example, the terminal device and the network device may agree in advance that corresponding physical resources are 1-4 (assumed that all physical resources are divided into 20 and different numbers of the physical resources correspond to unique positions) when the beam number or the transmission number N is 4. When the terminal device needs to transmit the random access signal, the physical resources 1-4 may be determined according to the beam number or the transmission number N to transmit the random access signal. The terminal device and the network device may further agree sequence resources used by signals corresponding to respective beam in advance. The sequence resources may be used for determining sequences used to transmit the signals. It should be understood that the above examples are merely schematic to this embodiment of the disclosure and this embodiment of the disclosure is not limited to the examples.

In an optional embodiment of the disclosure, the operation that the first device performs transmission of with the second device according to the beam number includes the following action. The first device sends, according to the beam number, the signals beamformed with beams corresponding to the beam number to the second device; or the first device receives signals beamformed with beams corresponding to the beam number from the second device.

In another optional embodiment of the disclosure, the operation that the first device performs transmission of with the second device according to the transmission number N includes the following action. The first device sends N signals to the second device according to the transmission number N, or the first device receives N signals sent by the second device according to the transmission number N.

It should be understood that the transmission generally includes receiving and sending. In other words, the transmission in the embodiment of the disclosure includes that the first device sends the signals and the first device receives the signals. Further, the first device sends beamformed signals to the second device according to the determined beam number or transmission number N, or the first device receives the beamformed signals sent by the second device according to the determined beam number or transmission number N.

In an optional embodiment, the N signals are formed using different beams, and N is a positive integer greater than 1. Specifically, it refers to that the signals may be formed by using different beams and may also be performed sending beamforming by using different beams.

Further, in the embodiment of the disclosure, after the first device performs transmission of the signals with the second device according to the beam number or the transmission number N, the method further includes the following operations. The first device receives, according to the beam number or the transmission number N, feedback information sent by the second device, or the first device sends, according to the beam number or the transmission number N, feedback information to the second device. The feedback information is used for indicating a first beam in a beam set corresponding to the beam number, or a first signal in a signal set corresponding to the transmission number N.

It is to be understood by those skilled in the art that the beamforming technology may be divided into a codebook-based manner and a channel reciprocity-based manner according to a feedback manner of channel information. The former is to enable the network device to determine a pre-coding codebook used in a next transmission based on codebook information fed back by the terminal, and the later is to obtain downlink channel information through channel reciprocity according to a Sounding Reference Signal (SRS) sent in uplink transmission and perform pre-coding matrix calculation and selection required for downlink transmission. For example, when N beams are adopted by the network device for beamforming, the terminal device generally reports a beam index, an index of a CSI-RS resource corresponding to the beam index or the like according to the beam number, so that the network device performs beamforming on subsequent data. Generally, the beam index reported by the terminal device may be a beam used by a signal with the best signal quality in downlink signals that are sent by the network device using a plurality of beams, and may also be a beam index of a signal with second best signal quality, or other beams, all of which will not be limited in the disclosure.

In an optional embodiment, the feedback information includes at least one of a beam identifier of the first beam or CSI corresponding to the beam identifier, or the feedback information includes at least one of a signal identifier of the first signal or CSI corresponding to the signal identifier.

The first device may perform feedback of the beam identifier (such as the beam index) according to the beam number. Each beam identifier indicates an identifier of a beam in all beams corresponding to the beam number. For example, assumed that the beam number is N, the number of bits of one beam identifier may be log 2(N). The terminal may receive signals corresponding to respective beams according to the beam number and thus reports beam identifiers. The first device may further perform feedback of CSI corresponding to each beam identifier. Specifically, besides feeding back information for indicating a certain beam, the first device further needs to feed back CSI obtained by measuring the beam. For example, the CSI includes at least one of an RI, a PMI or a CQI.

The first device performs feedback of signal identifiers according to the number of signals. Each signal identifier indicates an identifier of a signal in all signals corresponding to the number of signals. For example, assumed that the number of signals is N, the number of bits of one signal identifier may be log 2(N). Herein, the signals may be represented by resources used by the signals. Therefore, the signal identifiers may also be signal resource identifiers such as a CSI-RS resource identifier. For example, the first device determines that the number of CSI-RS resources is 4, then the first device detects CSI-RS signals on the four CSI-RS resources respectively to obtain a CSI-RS signal with the best signal quality in the detected signals and determines an index of a CSI-RS resource corresponding to the CSI-RS signal as a signal identifier to feed back to the second device.

The first device may further simultaneously perform feedback of CSI corresponding to the signal identifier. Specifically, besides feeding back the resource identifiers, the first device further needs to feed back the CSI obtained by measuring signals corresponding to the resource identifiers. For example, the CSI includes at least one of an RI, a PMI or a CQI.

It should be understand that in the embodiment of the disclosure, the first device may be the network device or the terminal device, while the second device may also be the network device or the terminal device. Further, the interaction between the terminal device and the network device, the interaction between the terminal device and the terminal device and the interaction between the network device and the network device may be specifically referred to the above technical solutions.

The method for transmitting the signals according to the embodiments of the disclosure is described above in detail. A device for transmitting information according to the embodiments of the disclosure will be described below in combination with FIG. 4 and FIG. 5. Technical features described in the method embodiment are also applied to the following device embodiment.

Figure 4:
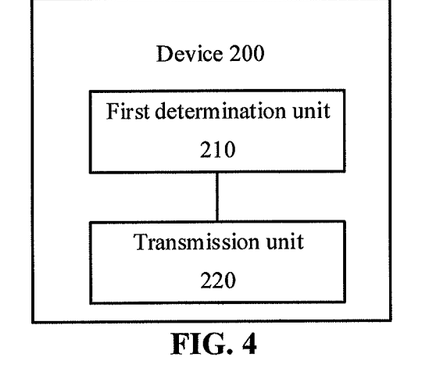
FIG. 4 illustrates a schematic block diagram of a device for transmitting signals provided by an embodiment of the disclosure.

FIG. 4 illustrates a device 200 for transmitting signals according to an embodiment of the disclosure. The device 200 is a first device. As illustrated in FIG. 4, the device 200 includes a first determination unit 210 and a transmission unit 220.

The first determination unit 210 is configured to determine, according to at least one of a numerology or an operating frequency band for transmitting signals, a beam number for transmitting the signals or a transmission number N of the signals, wherein N is a positive integer.

The transmission unit 220 is configured to performs transmission of the signals with a second device according to the beam number or the transmission number N.

Therefore, the device for transmitting the signals provided by the embodiment of the disclosure may flexibly determine the beam number or the transmission number of the signals according to at least one of the numerology or the operating frequency band used to transmit the signals, such that a better beamforming gain may be obtained.

In an optional embodiment of the disclosure, the device 200 may further include a second determination unit 230.

The second determination unit 230 may be configured to determine the numerology from at least one numerology, or determine the operating frequency band from at least one operating frequency band.

Since different numerologies or operating frequency bands generally correspond to different beamwidths, when a plurality of numerologies or a plurality of operating frequency bands are provided between the first device and the second device, different numbers of beams may be used to perform beamforming at different beamwidths, such that a good tradeoff between the signal overhead and the beamforming gain may be achieved.

In an optional embodiment of the disclosure, the first determination unit 210 may specifically be configured to: determine the beam number or the transmission number N according to the numerology and a predefined first association, wherein the first association is an association between the numerology and the beam number or an association between the numerology and the transmission number N; or determine the beam number or the transmission number N according to the operating frequency band and a predefined second association, wherein the second association is an association between the operating frequency band and the beam number or an association between the operating frequency band and the transmission number N.

In an optional embodiment of the disclosure, the transmission unit 220 may specifically be configured to determine, according to the beam number or the transmission number N, physical resources or sequence resources corresponding to the beam number or the transmission number N and perform transmission of the signals with the second device by adopting the physical resources or the sequence resources.

In an optional embodiment of the disclosure, the transmission unit 220 may specifically be configured to send, according to the beam number, the signals beamformed with beams corresponding to the beam number to the second device, or receive the signals beamformed with beams corresponding to the beam number from the second device.

In an optional embodiment of the disclosure, the transmission unit 220 may specifically be configured to send N signals to the second device according to the transmission number N, or receive N signals sent by the second device according to the transmission number N.

In an optional embodiment of the disclosure, the N signals are beamformed with different beams, and N is a positive integer greater than 1.

In an optional embodiment of the disclosure, the transmission unit 220 may further be configured to receive feedback information sent by the second device according to the beam number or the transmission number N, or send feedback information to the second device according to the beam number or the transmission number N. The feedback information may be used for indicating a first beam in a beam set corresponding to the beam number, or a first signal in a signal set corresponding to the transmission number N.

In an optional embodiment of the disclosure, the feedback information may include at least one of a beam identifier of the first beam or CSI corresponding to the beam identifier, or the feedback information may include at least one of a signal identifier of the first signal or CSI corresponding to the signal identifier.

In an optional embodiment of the disclosure, the CSI may include at least one of an RI, a PMI or a CQI.

In an optional embodiment of the disclosure, the second determination unit 230 may specifically be configured to: determine the numerology according to indication information sent by the second device, wherein the indication information is used for indicating one of the at least one numerology; or determine the numerology from the at least one numerology according to a service type or an operating frequency point of transmission data; or determine the numerology via a blind detection on the at least one numerology.

In an optional embodiment of the disclosure, the signals may include at least one signal of a synchronization signal, a broadcast signal, a random access signal or a downlink reference signal.

In an optional embodiment of the disclosure, the numerology may includes at least one parameter of the followings: a subcarrier spacing, the number of subcarriers in a system bandwidth, the number of subcarriers in a PRB, the length of an OFDM symbol, the number of points of FFT or IFFT for generating an OFDM signal, the number of OFDM symbols in a TTI, the number of TTIs within a predetermined period of time and a type of a signal prefix.

In an optional embodiment of the disclosure, the first device may be a network device and the second device may be a terminal device; or, the first device may be a terminal device and the second device may be a network device; or, the first device may be a terminal device and the second device may be a terminal device.

It should be understood that the device 200 for transmitting the signals according to the embodiment of the disclosure may correspond to the first device in the method embodiment of the disclosure. Furthermore, the above and other operations and/or functions of units in the device 200 are respectively intended to implement a corresponding process of the method in FIG. 3 and will not be repeated for the briefness.

Figure 5:
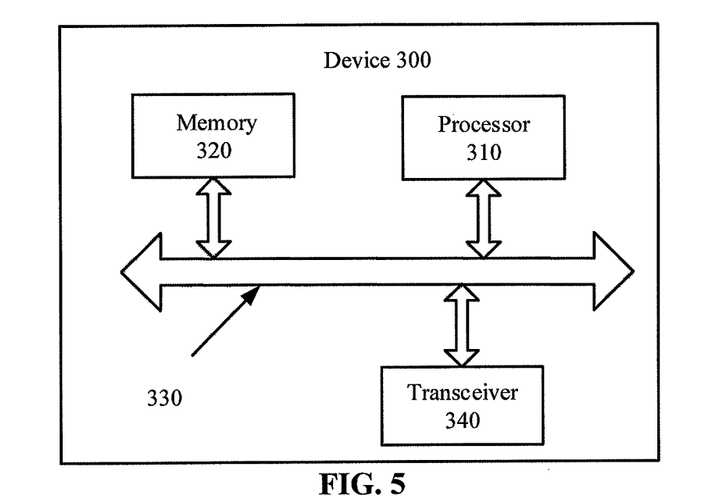
FIG. 5 illustrates another schematic block diagram of a device for transmitting signals provided by an embodiment of the disclosure.

As illustrated in FIG. 5, an embodiment of the disclosure further provides a device 300 for transmitting signals. The device 300 is a first device. The device 300 includes a processor 310, a memory 320, a bus system 330 and a transceiver 340. The processor 310, the memory 320 and the transceiver 340 are connected via the bus system 330. The memory 320 is configured to store an instruction. The processor 310 is configured to execute the instruction stored in the memory 320 to control the transceiver 340 to send the signals. The processor 310 may be configured to determine, according to at least one of a numerology or an operating frequency band for transmitting the signals, the beam number for transmitting the signals or determines the transmission number N of the signals and perform transmission of the signals with a second device according to the beam number or the transmission number N. N is a positive integer.

Therefore, the device for transmitting the signals provided by the embodiment of the disclosure may flexibly determine the beam number or the transmission number of the signals according to at least one of the numerology or the operating frequency band used to transmit the signals, such that a better beamforming gain may be obtained.

It should be understood that in the embodiment of the disclosure, the processor 310 may be a Central Processing Unit (abbreviated as CPU), and the processor 310 may also be other universal processor, a Digital Signal Processor (DSP), an Application Specific Integrated Circuit (ASIC), a Field Programmable Gate Array (FPGA) or other programmable logic device, discrete gate or transistor logic device, discrete hardware component and the like. The universal processor may be a microprocessor or the processor may also be any conventional processor and the like.

The memory 320 may include a Read-Only Memory (ROM) and a Random-Access Memory (RAM) and provides instructions and data to the processor 310. A part of the processor 320 may further include a nonvolatile random access memory. For example, the processor 320 may further store information of a device type.

The bus system 330 may include a data bus, and may further include a power bus, a control bus, a state signal bus and the like. However, for clear description, various buses in the figure are marked as the bus system 330.

In an implementation process, each operation of the above method may be completed by an integrated logic circuit of hardware in the processor 310 or an instruction in a software form. The operations of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or Electrically Erasable PROM (EEPROM) and a register. The storage medium is located in the memory 320. The processor 310 reads information in the memory 320 and completes the operations of the method in combination with hardware. No more detailed descriptions will be made herein to avoid repetitions.

In an optional embodiment of the disclosure, the processor 310 may further be configured to determine the numerology from at least one numerology, or determine the operating frequency band from at least one operating frequency band.

In an optional embodiment of the disclosure, the processor 310 may further be configured to: determine the beam number or the transmission number N according to the numerology and a predefined first association, wherein the first association is an association between the numerology and the beam number or an association between the numerology and the transmission number N; or determine the beam number or the transmission number N according to the operating frequency band and a predefined second association, wherein the second association is an association between the operating frequency band and the beam number or an association between the operating frequency band and the transmission number N.

In an optional embodiment of the disclosure, the processor 310 may specifically be configured to determine, according to the beam number or the transmission number N, physical resources or sequence resources corresponding to the beam number or the transmission number N and perform transmission of the signals with the second device by adopting the physical resources or the sequence resources.

In an optional embodiment of the disclosure, the processor 310 may specifically be configured to send, according to the beam number, the signals beamformed with beams corresponding to the beam number to the second device, or receive the signals beamformed with beams corresponding to the beam number from the second device.

In an optional embodiment of the disclosure, the processor 310 may specifically be configured to send N signals to the second device according to the transmission number N, or receive N signals sent by the second device according to the transmission number N.

In an optional embodiment of the disclosure, the processor 310 may specifically be configured to perform beamforming on the N signals with different beams, and N is a positive integer greater than 1.

In an optional embodiment of the disclosure, the processor 310 may further be configured to: receive, according to the beam number or the transmission number N, feedback information sent by the second device; or send, according to the beam number or the transmission number N, feedback information to the second device. The feedback information may be used for indicating a first beam in a beam set corresponding to the beam number, or a first signal in a signal set corresponding to the transmission number N.

In an optional embodiment of the disclosure, the feedback information may include at least one of a beam identifier of the first beam or CSI corresponding to the beam identifier, or the feedback information may include at least one of a signal identifier of the first signal or CSI corresponding to the signal identifier.

In an optional embodiment of the disclosure, the CSI may include at least one of an RI, a PMI or a CQI.

In an optional embodiment of the disclosure, the processor 310 may specifically be configured to: determine the numerology according to indication information sent by the second device, wherein the indication information is used for indicating one of the at least one numerology, or determine the numerology from the at least one numerology according to a service type or an operating frequency point of transmission data, or determine the numerology via a blind detection on the at least one numerology.

In an optional embodiment of the disclosure, the signals may include at least one signal of a synchronization signal, a broadcast signal, a random access signal or a downlink reference signal.

In an optional embodiment of the disclosure, the numerology may include at least one parameter of the followings: a subcarrier spacing, the number of subcarriers in a system bandwidth, the number of subcarriers in a PRB, the length of an OFDM symbol, the number of points of FFT or IFFT for generating an OFDM signal, the number of OFDM symbols in a the number of TTIs within a predetermined period of time and a type of a signal prefix.

In an optional embodiment of the disclosure, the first device may be a network device and the second device may be a terminal device; or, the first device may be a terminal device and the second device may be a network device; or, the first device may be a terminal device and the second device may be a terminal device.

It should be understood that the device 300 for transmitting the signals according to the embodiment of the disclosure may correspond to the first device and the device 200 in the embodiment of the disclosure, and may correspond to the first device for executing the method according to the embodiment of the disclosure. Furthermore, the above and other operations and/or functions of each unit in the device 300 are intended to implement a corresponding process of the method in FIG. 3 and will not be repeated for the briefness.

It should be understood that in the embodiments of the disclosure, "B corresponding to A" represents that the B is associated with the A and B may be determined according to A. However, it should be further understood that determining B according to A does not mean that B is determined only according to A and B may also be determined according to A and/or other information.

Those of ordinary skill in the art may realize that the units and algorithm operations of each example described in combination with the embodiments disclosed in the disclosure may be implemented by electronic hardware, computer software or a combination of computer software and the electronic hardware. In order to describe the interchangeability between hardware and software, the constitutions and operations of each example are described generally according to functions in the above description. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit. The above integrated unit may be implemented in a form of hardware and may also be implemented in a form of a software functional unit.

When being realized in form of software functional unit and sold or used as an independent product, the integrated unit may also be stored in a computer-readable storage medium. Based on such an understanding, the technical solutions of the disclosure substantially or parts making contributions to the conventional art or all or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any equivalent variations or replacements may be conceived by those skilled in the art within the technical scope disclosed by the disclosure.

The invention claimed is:

1. A method for transmitting signals, comprising:
   determining, by a first device according to a subcarrier spacing and an operating frequency band for transmitting signals, a transmission number N of the signals; wherein the signals comprise a Physical Broadcast Channel (PBCH), and the operating frequency band is transmitting frequency band of PBCH; and
   transmitting, by the first device, the signals to a second device according to the transmission number N, wherein the transmission number N of the signals is 4 when the subcarrier spacing is 15 kHz in the operating frequency band; the transmission number N of the signals is 8 when the subcarrier spacing is 30 kHz in the operating frequency band.

2. The method of claim 1, wherein before determining, by the first device according to the subcarrier spacing and the operating frequency band for transmitting the signals, the transmission number N of the signals, the method further comprises:
   determining, by the first device, the subcarrier spacing from at least one subcarrier spacing, and determining the operating frequency band from at least one operating frequency band.

3. The method of claim 2, wherein determining, by the first device, the subcarrier spacing from the at least one subcarrier spacing comprises:
   determining, by the first device, the subcarrier spacing according to indication information sent by the second device, wherein the indication information is to indicate one of the at least one subcarrier spacing; or
   determining, by the first device, the subcarrier spacing from the at least one subcarrier spacing according to a service type or an operating frequency of transmission data; or
   determining, by the first device, the subcarrier spacing via a blind detection on the at least one subcarrier spacing.

4. The method of claim 1, wherein determining, by the first device according to the subcarrier spacing and the operating frequency band for transmitting the signals, the transmission number N of the signals comprises:
   determining, by the first device according to the subcarrier spacing the operating frequency band and a predefined association, the transmission number N, wherein the predefined association is an association among the subcarrier spacing the operating frequency band and the transmission number N.

5. The method of claim 1, wherein transmitting, by the first device the signals to the second device according to the transmission number N comprises:
   determining, by the first device according to the transmission number N, physical resources or sequence resources corresponding to the transmission number N; and
   transmitting, by the first device, the signals the second device by adopting the physical resources or the sequence resources.

6. The method of claim 1, wherein transmitting, by the first device, the signals to the second device according to the transmission number N comprises:
   sending, by the first device, N signals to the second device according to the transmission number N.

7. The method of claim 6, wherein the N signals are beamformed with different beams and N is a positive integer greater than 1.

8. The method of claim 1, wherein the first device is a network device, and the second device is a terminal device.

9. A device for transmitting signals, the device being a first device and comprising: a memory and a processor, the memory storing one or more computer programs that, when executed by the processor, cause the processor to execute operations comprising:
   determining, according to a subcarrier spacing and an operating frequency band for transmitting signals, a transmission number N of the signals; wherein the signals comprise a Physical Broadcast Channel (PBCH) and the operating frequency band is transmitting frequency band of PBCH; and
   transmitting the signals to a second device according to the transmission number N, wherein the transmission number N of the signals is 4 when the subcarrier spacing is 15 kHz in the operating frequency band, the transmission number N of the signals is 8 when the subcarrier spacing is 30 kHz in the operating frequency band.

10. The device of claim 9, wherein the operations further comprise:
    determining the transmission number N according to the subcarrier spacing, the operating frequency band and a predefined association, wherein the predefined association is an association among the subcarrier spacing, the operating frequency band the transmission number N.

11. The device of claim 9, wherein the operations further comprise:

determining, according to the transmission number N, physical resources or sequence resources corresponding to the transmission number N; and transmitting the signals to the second device by adopting the physical resources or the sequence resources.

12. The device of claim 9, wherein the operations further comprise:

sending, according to the transmission number N, N signals to the second device.

13. The device of claim 9, wherein the operations further comprise:

determining the subcarrier spacing from at least one subcarrier spacing, and determining the operating frequency band from at least one operating frequency band.

14. The device of claim 13, wherein the operations further comprise:

determining the subcarrier spacing according to indication information sent by the second device, wherein the indication information is to indicate one of the at least one subcarrier spacing; or determining the subcarrier spacing from the at least one subcarrier spacing according to a service type or an operating frequency of transmission data; or determining the subcarrier spacing via a blind detection on the at least one subcarrier spacing.

15. A method for receiving signals, comprising:

receiving, by a second device, N signals transmitted on a Physical Broadcast Channel (PBCH) from a first device; wherein the transmission number N of the signals is determined according to a subcarrier spacing and an operating frequency band for PBCH, and the transmission number N of the signals is 4 when the subcarrier spacing is 15 kHz in the operating frequency band, the transmission number N of the signals is 8 when the subcarrier spacing is 30 kHz in the operating frequency band; and processing, by the second device, the received N signals.

* * * * *